(12) United States Patent
Mackenzie

(10) Patent No.: US 6,250,470 B1
(45) Date of Patent: Jun. 26, 2001

(54) SPORTS EQUIPMENT BAG

(76) Inventor: Scott Mackenzie, 1445 Kirston St., Reno, NV (US) 89503-1930

( * ) Notice: Subject to any disclaimer, the term of this patent is extended or adjusted under 35 U.S.C. 154(b) by 0 days.

(21) Appl. No.: 09/369,695

(22) Filed: Aug. 6, 1999

(51) Int. Cl.[7] .................................................. B65D 69/00
(52) U.S. Cl. ................... 206/579; 206/315.11; 190/109; 190/115
(58) Field of Search .................................. 206/579, 315.1, 206/315.11; 43/21.2, 54.1, 26; 150/118, 119; 190/115, 109, 110

(56) References Cited

U.S. PATENT DOCUMENTS

| | | | |
|---|---|---|---|
| D. 340,131 | * | 10/1993 | Cassidy, IV .................... 206/315.1 |
| 4,773,535 | * | 9/1988 | Cook ..................................... 206/373 |
| 5,052,555 | * | 10/1991 | Harmon ........................... 206/315.11 |
| 5,319,874 | * | 6/1994 | Vance ............................... 206/315.11 |
| 5,423,404 | * | 6/1995 | Shaw ..................................... 190/109 |
| 5,447,215 | * | 9/1995 | Volkmar et al. ...................... 190/109 |
| 5,447,216 | * | 9/1995 | Freyvogel .......................... 206/315.1 |
| 5,642,809 | * | 7/1997 | Mayville ........................... 206/315.1 |
| 5,829,502 | * | 11/1998 | Distefano et al. ................... 190/110 |
| 5,845,780 | * | 12/1998 | Allen .................................... 206/579 |

* cited by examiner

Primary Examiner—Luan K. Bui
(74) Attorney, Agent, or Firm—Skinner, Sutton, Watson & Rounds

(57) ABSTRACT

This invention relates to an apparatus which allows the facile carrying and storage of large equipment; more particularly, this invention relates to the use of a sports equipment bag for the facile carrying of large sports equipment; even more particularly, this invention relates to the use of a sports equipment bag for the facile carrying of fishing equipment, such as two fishing poles, as well as other related fishing equipment, such as tackle, knives, and other similar materials.

7 Claims, 3 Drawing Sheets

SPORTS EQUIPMENT BAG

BACKGROUND OF THE INVENTION

1. Field of the Invention

This invention relates to an apparatus which allows the facile carrying and storage of large equipment; more particularly, this invention relates to the use of a sports equipment bag for the facile carrying of large sports equipment; even more particularly, this invention relates to the use of a sports equipment bag for the facile carrying of fishing equipment, such as two fishing poles, as well as other related fishing equipment, such as tackle, knives, and other similar materials.

2. State of the Art

Storage of fishing equipment for travel and use in a safe, convenient, and efficient manner has been a problem to which considerable attention need be given. Industries and hobbies such as fishing, hunting, and skiing require various equipment that must be stored and sorted for convenient transportation and use of the equipment. These and other industries and hobbies have often found it helpful to use storage boxes, toolboxes, and the like in organization and transportation of the various tools and equipment.

However, when carrying all necessary equipment, for example, a fishing pole in one hand and a tackle box in the other, this requires the use of both hands, thereby leaving no free hand. This may pose a safety issue. Some fishing areas require a fisherman to walk down steep hills, whereas others require a fisherman to walk down steep hills having unstable rocks. With both hands full, there is no way for a fisherman to stop a fall or support himself on the rocks while walking down to the fishing area.

Moreover, many children enjoy fishing and most ride bicycles to the fishing areas. With one hand holding a fishing pole, the other holding a tackle box, and both hands trying to steer the bicycle at the same time, this is also a safety concern. The tip of the fishing pole may get caught on low hanging trees thereby causing the child to fall off the bike. Moreover, with more and more cars on the road, the safety concern is an issue. Should the child not have a good grip on the fishing pole or the tackle box, it may fall and cause the child to lose his concentration and control thereby falling off the bike or turning into traffic. Therefore, there is a need for an easier and safer way to carry fishing equipment.

Furthermore, after a fisherman frustratingly makes his way to the fishing site, most realize that they carried a lot of extra unnecessary weight. Tackle boxes are used to store and carry all the fisherman's fishing tackle. However, not all tackle are used in one fishing trip and when carrying an entire tackle box with miscellaneous material, a fisherman is required to carry extra unnecessary weight. Therefore, there is a need for a more convenient way to carry fishing gear that is used only for that day.

Additionally, many fisherman travel, either by air or otherwise, around the world to compete or just to "test out" the fishing in a remote part of the world. Tackle boxes are not easily packed in a luggage or carried during travel. Moreover, tackle boxes are also troublesome during travel since the upsetting or overturning of such a tackle box will generally create an immense tangle of lures inside the box. Furthermore, there is no convenient and easy way to carry, travel, or ship fishing poles. Therefore, there is a need for a convenient and easy way to carry and travel with large equipment such as a fishing pole.

Another concern is space on a fishing boat. Space is a premium in all boats particularly in some of the small fishing boats used by sport fishermen today. A large size tackle box is inconvenient and undesirable. Likewise, a series of smaller tackle boxes also takes up much space in a boat and is cumbersome for loading and unloading. Moreover, the fisherman must carry all of the boxes about or find adequate storage space on the boat. The use of a large tackle box also requires the fisherman to search through his box to find a particular lure since the lures are not readily visible at the same time in conventional tackle boxes. Additionally, some of theses tackle boxes also requires a large amount of space to unfold in order to access the most remote areas of the box further impinging on the space available. This is, of course, undesirable in a fishing situation.

Therefore, there is a definite need for a more practical apparatus that is user friendly, easy to carry and store bulky and large equipment for travel, and use in a safe, convenient, and efficient manner. This invention provides just that. This apparatus is a self-contained bag that allows a user to store all fishing equipment, including a pair of fishing poles. It allows the user to conveniently pack only the equipment necessary for that day, such as a specific type of fishing he may want to do on any given fishing trip. More importantly, it allows a user to carry all equipment in one hand, on his back, or over his shoulder, thereby leaving one or both hands free. This will allow a fisherman to walk safely down to a fishing area and allow a child to safely ride a bicycle with both hands free and clear with the bag on the child's back.

SUMMARY OF THE INVENTION

This invention relates to an apparatus for the facile carrying of large and bulky sports equipment such as fishing poles, skis and ski poles, pool sticks, and other similar large sports equipment as well as the sport accessories such as gloves, masks, tackle, knives, and other materials required for the sport. This invention comprises:

- a resilient material defining an inside, an outside, a first side, and a second side;
- a plurality of pockets attached to the inside having means to securely close the plurality of pockets;
- a plurality of utility straps having a first end and a second end attached to the inside;
- a plurality of fasteners attached to the inside; and
- a means to connect the first side to the second side thereby enclosing the sports equipment carrying apparatus.

A second preferred embodiment of this invention comprises:

- a resilient material defining an inside, an outside, a first side, and a second side;
- a plurality of pockets attached to the inside having means to securely close the plurality of pockets;
- a large pocket attached to the inside having means to securely close the large pocket;
- a plurality of utility straps having a first end and a second end attached to the inside;
- a plurality of fasteners attached to the inside; and
- a means to connect the first side to the second side thereby enclosing the sports equipment carrying apparatus.

DETAILED DESCRIPTION OF THE PREFERRED EMBODIMENT

This invention relates to an apparatus for the facile carrying of large and bulky sports equipment such as fishing poles, skis and ski poles, pool sticks, and other similar large sports equipment as well as the sport accessories such as gloves, masks, tackle, knives, and other materials required for the sport.

Figure 1:
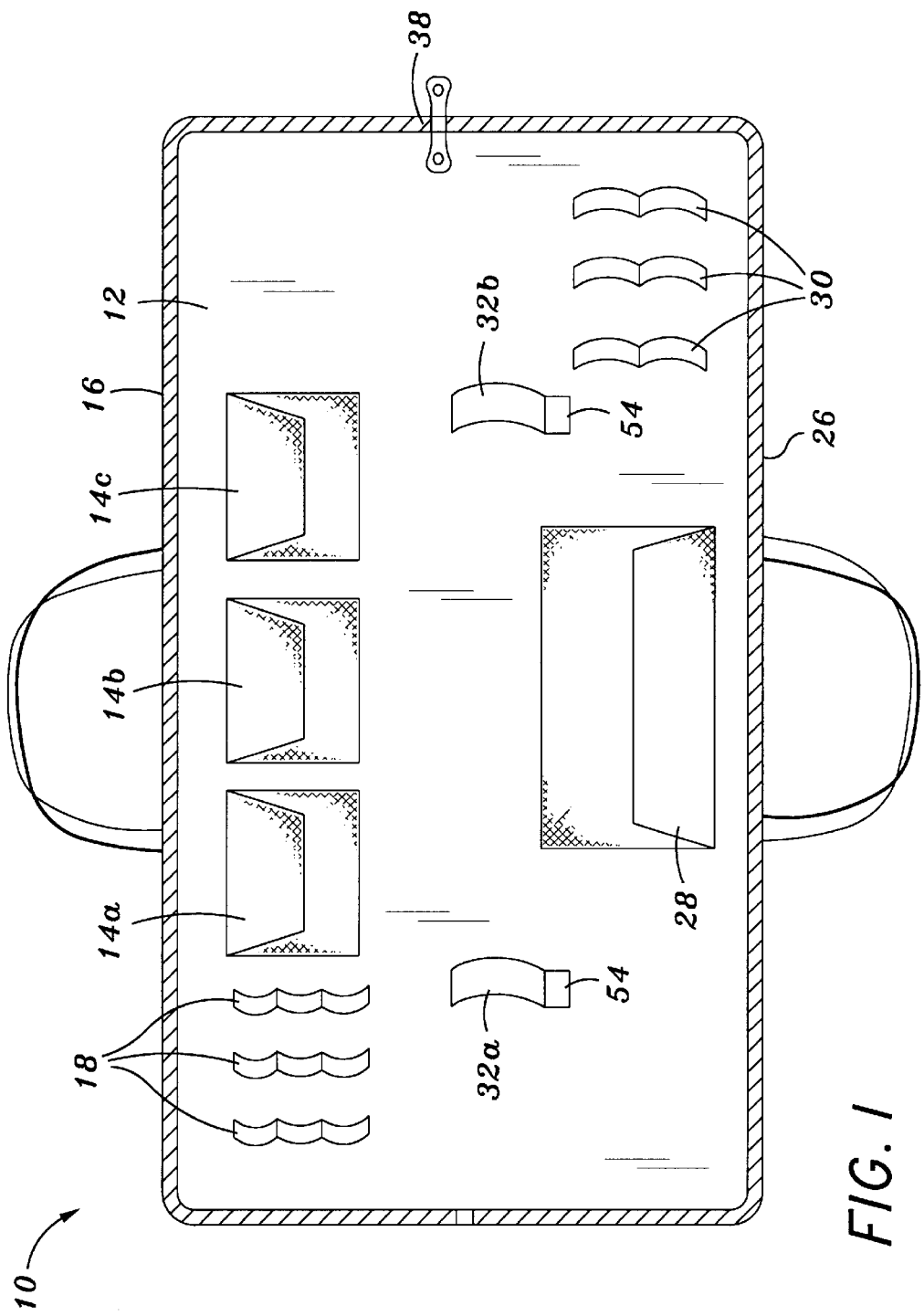
FIG. 1. shows a top view of the invention.
Figure 2:
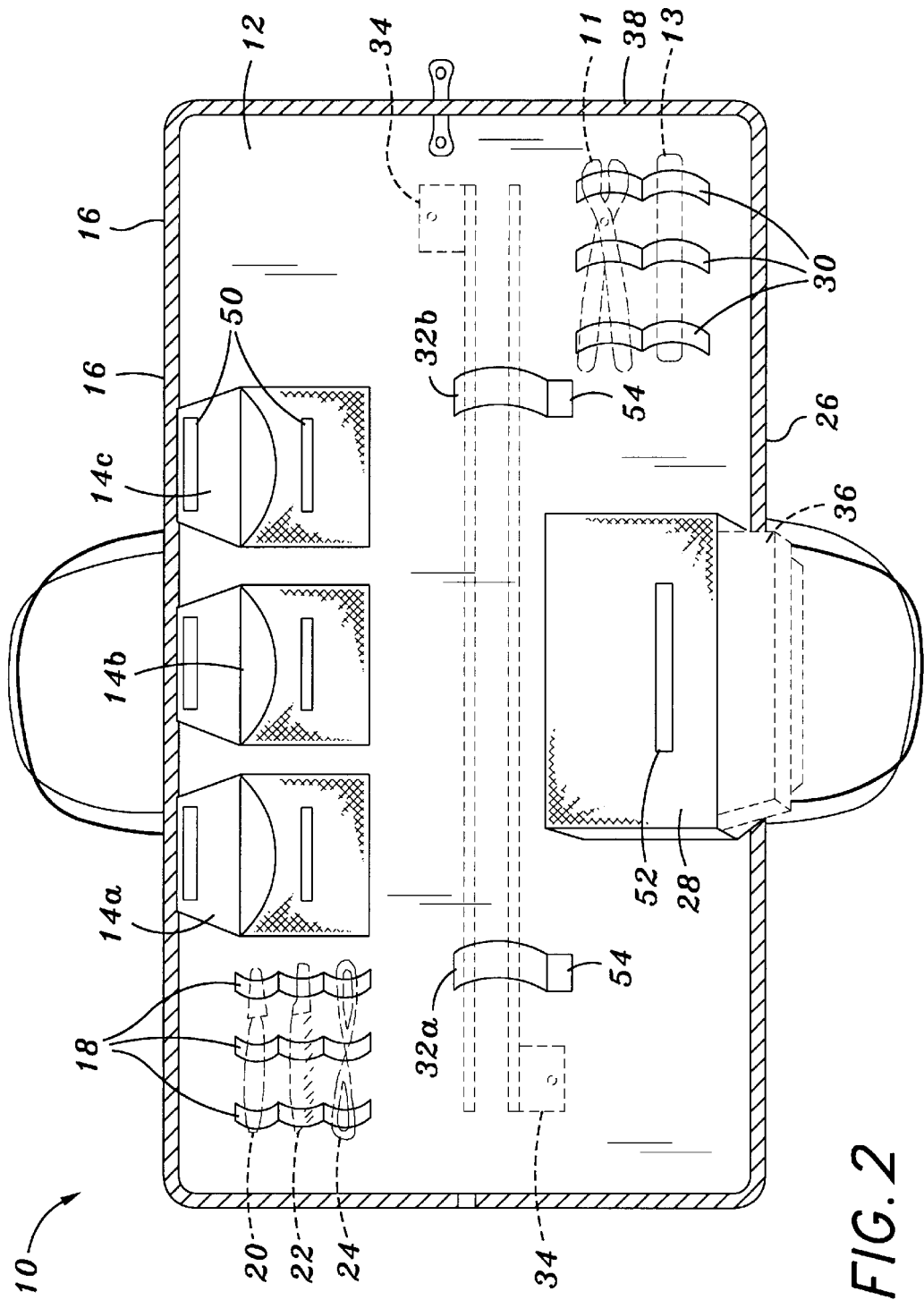
FIG. 2. shows yet another view of the invention having sports equipment secured within the invention.

Referring to FIG. 1 and FIG. 2, the equipment sports bag, generally referred to as 10, defines an inside 12 comprising a plurality of pockets 14a, 14b, and 14c proximate a first side 16. The pockets may be made from any material such as fabric (canvas, ballistic nylon, or similar materials), as shown in FIG. 1, or plastic. However, it is preferable that the pockets are made from Nylon netting, as shown in FIG. 2, allowing the user to see what is stored in the pockets before opening the pockets. It is also preferable, but not necessary, that the pockets be four to six inches in length and three and seven inches in width. The pockets may be used to hold equipment such as hooks, lures, bait, customized containers, and other similar equipment that is necessary for that day's use. It is preferable that the pockets are closed using hook and loop material 50 (as shown in FIG. 2), however, other means of closure may be used such as fasteners, buttons, and other similar materials.

There are a plurality of utility straps 18 proximate the first side 16. The utility straps are used to secure equipment (all shown in phantom) such as a knife 20, scraper 22, or a rope 24. The utility straps are made from elastic material that is well known in the art thereby enabling the equipment to be secure within the equipment sports bag. It is preferable, but not necessary, that the utility straps be placed one-half to three inches apart and are between three to nine inches in length. The plurality of utility straps 18 are affixed to the equipment sports bag by glue, are sewn, fastened, or affixed by other similar means, at points of between one-half to three inches, thereby forming a strap with three or more inserts.

Proximate the second side 26 is a large pocket 28. The large pocket may be made from any material such as fabric (canvas, ballistic nylon, or similar materials), as shown in FIG. 2, of plastic. However, it is preferable, that the pockets are made from Nylon netting, as shown in FIG. 1, allowing the user to see what is stored in the pockets before opening the pockets. It is also preferable, but not necessary, that the pockets be eight to thirteen inches in length and three to nine inches in width. The pocket may be used to hold equipment such as hooks, lures, bait, or containers 36 (shown in phantom) in FIG. 2. It is preferable that the large pocket be closed using hook and loop material 52 (as shown in FIG. 2), however, other means of closure may be used such as fasteners, buttons, and other similar materials. Moreover, the invention may contain a plurality of large pockets.

There is also a second plurality of utility straps 30 proximate the second side 26. The utility straps are also used to secure any necessary equipment. The utility straps are made from elastic material that is well known in the art thereby enabling the equipment to be secure within the equipment sports bag. It is preferable, but not necessary, that the utility straps be placed one-half to three inches apart and between three to nine inches in length. The plurality of utility straps 18 are affixed to the equipment sports bag by glue, are sewn, fastened, or affixed by any other similar means, at points of between one-half to four inches, thereby forming a strap with two or more inserts. These larger straps are to secure medium sized accessories such as pliers 11 (shown in phantom), ski mask, medium sized customized containers 13 (shown in phantom), or other similar accessories.

Substantially between the first side 16 and the second side 26 is a first fastener 32a and a second fastener 32b. The first fastener and second fastener are used to secure a pair of large equipment such as fishing poles (as shown in phantom) 34, skis, guns, or other similar long equipment. It is preferable that the fasteners be made from strong material such as nylon or any other fabric and secured to the equipment sports bag by hook and loop material 54 (shown in FIG. 1 and FIG. 2), glue, sewn, fastened, or affixed by other similar means. The number of fasteners is not important as long as the number of fasteners used are able to securely hold the sports equipment, such as a pair of fishing poles, in the sports equipment bag.

Figure 3:
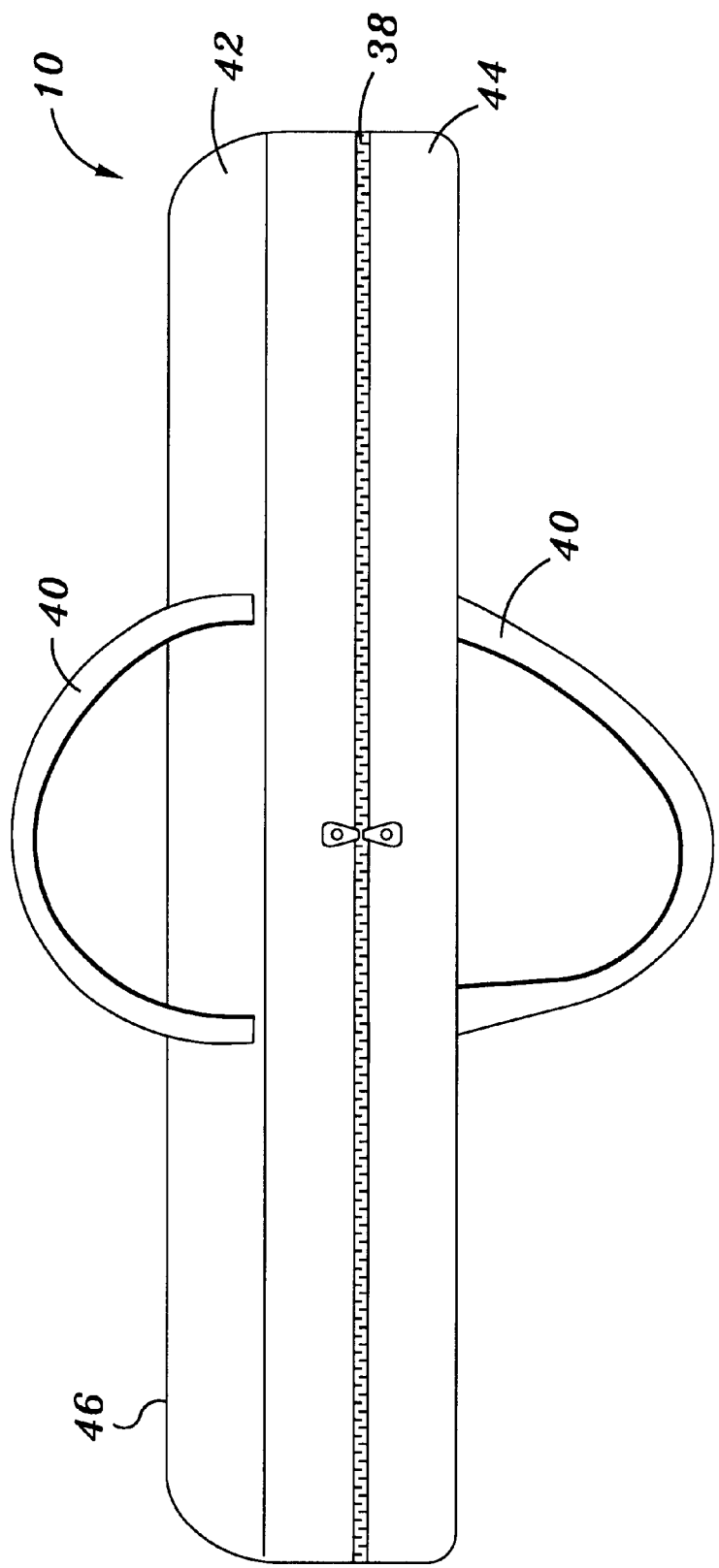
FIG. 3. is a drawing of the invention in a closed, tubular position.

To secure the first side 16 to the second side 26, it is preferable that a zipper 38 be sewn around the boarder of the equipment sports bag thereby forming a tubular shaped equipment sports bag as shown in FIG. 3. This will enclose all the sports equipment and provide a facile way of carrying and storing the equipment. Handle straps 40 are affixed to the outside 42 of the equipment sports bag 10. This will allow a user to use one hand to carry all the necessary equipment, allow the user to carry the equipment sports bag on his back, or allow the user to carry the equipment sports bag over his shoulder. The user will therefore have one or both hands free to perform other functions. It is preferable that the holding member be made from strong material such as nylon or any other fabric and be secured to the equipment sports bag by hook and loop material, glue, sewn, fastened, or affixed by other similar means. It is also preferable that the holding member be secured to the equipment sports bag from the first side 16 to the second side 26 thereby supporting the top 44 and the bottom 46 of the equipment sports bag.

The placement, number of, or dimensions of the pockets, strips, and fasteners are not important. For example, the sports equipment bag may contain only one pocket inside the bag. What is important is that the sports equipment bag is able to securely contain, hold, and store long equipment such as a pair of fishing poles as well as the sports related accessories and, consequently, the sports equipment bag is in a tubular form.

This invention has been described by reference to specific embodiments and examples thereof. Variations, modifications, and alterations of these embodiments and examples will suggest themselves to those of ordinary skill in the art. Therefore, the claims appended hereto are intended to encompass all such variations, modifications, and alterations.

What is claimed is:

1. A sports equipment carrying apparatus, comprising:
   a resilient material defining an inside, an outside, a first side, and a second side;
   a plurality of pockets attached to the inside having means to securely close the plurality of pockets;
   a large pocket attached to the inside having means to securely close the large pocket, the large pocket comprised of netting material and the large pocket is larger in size than the plurality of pockets, wherein the plurality of pockets is proximate the first side and the large pocket is proximate the second side;
   a plurality of elastic utility straps having a first end and a second end attached to the inside, the plurality of utility straps attached to the inside at a first point;

a plurality of hook and loop fasteners attached to the inside having a hook portion and a loop portion, the hook portion permanently attached to the inside and the loop portion removably attached to the inside to hold an item between the plurality of fasteners, wherein the plurality of fasteners are substantially between the first side and the second side; and a zipper to connect the first side to the second side thereby enclosing the sports equipment carrying apparatus.

2. The apparatus of claim 1 wherein the resilient material is substantially in the form of a rectangle.

3. The apparatus of claim 1 wherein the plurality of utility straps comprises a first plurality of utility straps proximate the first side and a second plurality of utility straps proximate the second side.

4. The apparatus of claim 1 wherein the plurality of fasteners are connected to the resilient material at a top and are removably attached to the resilient material at a bottom.

5. The apparatus of claim 1 further comprising a plurality of handle straps attached to the outside.

6. A sports equipment carrying apparatus, comprising:

a resilient material defining an inside, an outside, a first side, and a second side;

a plurality of pockets attached to the inside having hook and loop fasteners to securely close the plurality of pockets, wherein the pockets are made of fabric;

a large pocket attached to the inside having means to securely close the large pocket, the large pocket comprised of nylon netting material and the large pocket is larger in size than the plurality of pockets, wherein the plurality of pockets is proximate the first side and the large pocket is proximate the second side;

a plurality of elastic straps having a first end and a second end attached to the inside, the plurality of elastic straps attached to the inside at a first point, wherein the elastic straps are 3 to 9 inches in length and wherein the elastic straps are placed ½ inches to 3 inches apart;

a plurality of hook and loop fasteners attached to the inside having a hook portion and a loop portion, the hook portion permanently attached to the inside and the loop portion removably attached to the inside to hold an elongated item between the plurality of fasteners, wherein the plurality of fasteners are substantially between the first side and the second side;

a zipper to connect the first side to the second side thereby enclosing the sports equipment carrying apparatus; and a pair handle straps attached to the outside.

7. The apparatus of claim 6 further comprising a top and a bottom that are longer than the first and second sides.

* * * * *